US012303910B2

(12) United States Patent
Jupe

(10) Patent No.: US 12,303,910 B2
(45) Date of Patent: May 20, 2025

(54) CRYSTAL GROWTH ENHANCEMENT DEVICE

(71) Applicant: Mike Jupe, West, TX (US)

(72) Inventor: Mike Jupe, West, TX (US)

( * ) Notice: Subject to any disclaimer, the term of this patent is extended or adjusted under 35 U.S.C. 154(b) by 303 days.

(21) Appl. No.: 17/927,464

(22) PCT Filed: Jul. 2, 2021

(86) PCT No.: PCT/US2021/040228
§ 371 (c)(1),
(2) Date: Nov. 23, 2022

(87) PCT Pub. No.: WO2022/010757
PCT Pub. Date: Jan. 13, 2022

(65) Prior Publication Data

US 2023/0173500 A1 Jun. 8, 2023

Related U.S. Application Data

(60) Provisional application No. 63/049,660, filed on Jul. 9, 2020.

(51) Int. Cl.

| | |
|---|---|
| ***B02C 4/02*** | (2006.01) |
| ***B02C 4/08*** | (2006.01) |
| ***B02C 4/42*** | (2006.01) |
| ***B02C 19/00*** | (2006.01) |
| ***B02C 23/18*** | (2006.01) |

(52) U.S. Cl.
CPC .................. *B02C 4/02* (2013.01); *B02C 4/42* (2013.01)

(58) Field of Classification Search
CPC .... B02C 4/02; B02C 4/20; B02C 4/30; B02C 4/42; B02C 4/44; B02C 23/18
See application file for complete search history.

(56) References Cited

U.S. PATENT DOCUMENTS

2010/0301145 A1* 12/2010 Memari Fard ............ B02C 4/42 241/222
2019/0105661 A1* 4/2019 Harrison ................ B01D 17/02

FOREIGN PATENT DOCUMENTS

FR 2605248 A * 4/1988 ............. B02C 23/36

OTHER PUBLICATIONS

Translation of FR 2605248; Submerged crusher with recirculation; Bernard J; (Year: 1886).*

* cited by examiner

*Primary Examiner* — Christopher L Templeton
*Assistant Examiner* — Eugene Hyun Kim
(74) *Attorney, Agent, or Firm* — William Lovin & Associates, LLC; William R. Lovin

(57) ABSTRACT

This device crushes crystal granules in a solution to maintain granule size, shape, and texture. This is done by an inline crushing and grinding mill with fluted crushing rollers rotating at different speeds featuring a protective emergency fluidic bypass channel and follow-on emergency fluidic waste drain.

8 Claims, 3 Drawing Sheets

CRYSTAL GROWTH ENHANCEMENT DEVICE

CROSS-REFERENCE TO RELATED APPLICATIONS

This application makes reference to U.S. Prov. Pat. No. 63/049,660 filed Jul. 9, 2020 and incorporates that application, in its entirety, by reference.

FIELD OF THE INVENTION

This invention relates to a means of crushing crystal granules in a solution to maintain granule size, shape, and texture. This is done by an inline crushing and grinding mill with fluted rollers rotating at different speeds equipped with an emergency fluidic bypass channel and a follow-on emergency fluidic waste drain.

BACKGROUND OF THE INVENTION

Aspects of the present invention relate to a mechanical means of controlling the physical characteristics of aqueous crystals involved in crystallization, including, but not limited to: size, shape, and varied size distribution through mechanical means. Managing these attributes enhances the crystallization rate by increasing the absorption and precipitation from the aqueous media by maintaining a steady state of crystal particle size.

The mechanical means of controlling the physical characteristics of the crystals and other media involved in the crystallizing process are important, because, for a given shape, the surface to area volume (SA:V) ratio is inversely proportional to size. The SA:V ratio is the amount of surface area per unit volume of an object or collection of objects. In chemical reactions involving a solid material, the SA:V ratio governs the reactivity, that is, the rate at which the chemical reaction will proceed.

For a given volume, the object with the smallest surface area (and therefore with the smallest SA:V) is a sphere, because it has the same cross-sectional perimeter in any dimension.

By contrast, objects with tiny spikes have a very large surface area for a given volume. Small crystals with spikes have a larger SA:V ratio compared to larger more spherical crystals and thus have a greater influence on crystallization rates. Where many variably sized small crystals are present, a higher proportion of crystal growth can occur, thereby reducing the growth rates of larger more spherical crystals.

The larger a crystal grows the smoother and more uniform it becomes thus reducing its reactivity and reducing the growth equilibrium. Therefore, a mechanical means of cracking and shearing larger more spherical crystals into smaller particles with a variety of shapes and sizes with rough surface texture improves the overall crystallization rate of the solution.

SUMMARY OF THE INVENTION

The invention is intended to be used in a circulating system where reactions occur between components fluidically transported by the system. Such devices may be found in a system that process leachate from landfill sites, runoff from agricultural land, effluent from industrial processes, industrial process water, municipal wastewater, animal wastes, phosphogypsum carrying pond water, commercial fertilizer production and processing, along with natural occurring aqueous solution. Also, urea, potassium sulfate, thiamine nitrate, calcium chloride, $H_2S$ hydrate crystal, methane hydrate crystal, struvite crystal, vivianite crystal, sugar, carbonate apatite in aqueous solution (which may come from a wide range of sources), various prepared solutions, and so on, may be processed using the invention.

The device is comprised of a grinding element which is itself comprised of at least two fluted grinding rollers. The grinding rollers are powered by at least one electric, or any other kind, of motor affixed to mill drive coupling gears that have different diameters. As a result, the grinding rollers rotate at different speeds. Material in the system is cracked and broken down from larger particles or crystals that have a low surface area to volume (SA:V) ratio into smaller particles or crystals that have a higher SA:V ratio. The invention has an emergency bypass pathway to divert an excess volume of large particles or crystals around the grinding roller assembly if the grinding roller assembly is temporarily overloaded. Also, the invention has an emergency dump pathway where particles are dumped to a drain if the system overloads further.

DETAILED DESCRIPTION OF THE INVENTION

In the following description, numerous specific details regarding possible componentry (e.g., standard pipe connectors, flanges, bearing housings, gears, and rollers) are set forth. Those skilled in the art will recognize, however, that the invention may be practiced apart from these specific details. For example, the invention may be constructed of polyvinylchloride (PVC) pipe, metal, or other structural components and assembled by means of glue or adhesive, welding, fastening, bolting, and/or screwing. All such variations in materials used to construct the present invention are specifically included in the spirit and scope of the disclosure.

Similarly, details well known and widely used in the process of manufacturing such equipment (e.g., threading and assembling pipe, plastic injection molding, metal casting techniques for assembling mechanical devices, etc.) and various miscellaneous components have been omitted, so as not to unnecessarily obscure the present invention.

Figure 1:
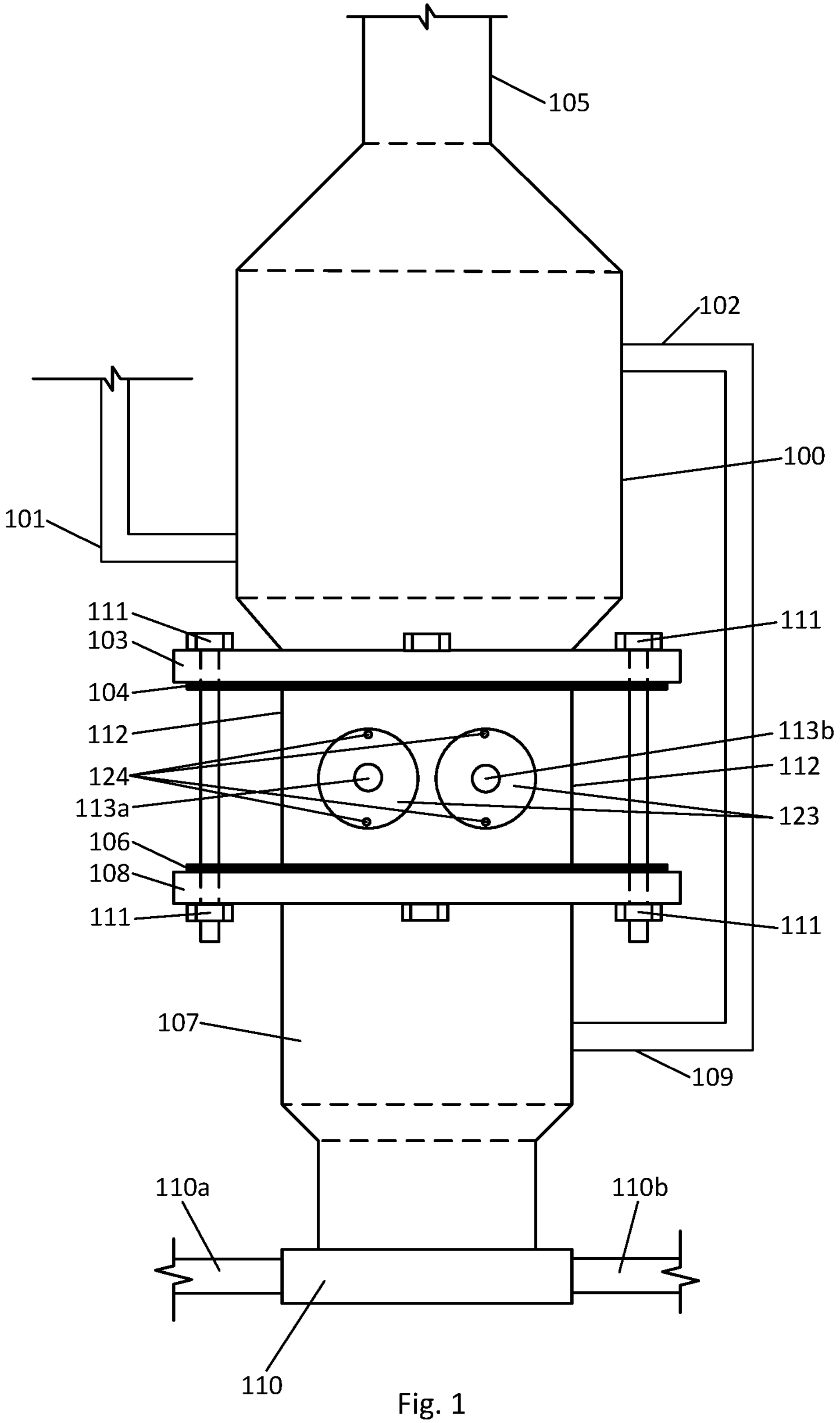
FIG. 1 is an elevation of an inline grinding mill with a fluidic bypass channel.

Referring now to FIG. 1, the mill feed inlet, influent material fluid containment section 100 comprises an inlet conduit or pipe 101 externally connected to a separate system (not shown). Material enters the system at this point. The influent material fluid containment section 100 further has outlet bypass conduit or pipe 102. This is connected to the influent material fluid containment section 100 above the level of the inlet conduit or pipe 101. All connections to the influent material fluid containment section 100 are by means of standard pipe connectors.

Connected to the bottom of the influent material fluid containment section 100 is standard pipe flange adapter 103 used to affix mill body 112 inlet 104 and influent material fluid containment section 100 by means of standard pipe flange adapter 103. Connected to the top end of the influent material fluid containment section 100 is sanitary drain port 105. The mill body 112 containing at least two fluted mill rollers 113*a* and 113*b* is connected to the bottom of the influent material containment section 100. The mill body 112 outlet 106 is affixed to the upper end of effluent material fluid containment section 107 by means of a standard pipe flange adapter 108. The two standard pipe flange adapters 103 and 108 are fastened together with flange bolts and nuts 111.

The effluent material fluid containment section 107 comprises an inlet bypass conduit or pipe 109 externally connected to the influent material fluid containment section 100 by means of outlet bypass conduit or pipe 102. This pathway comprises an overflow pathway should material become stuck or trapped in the crushing rollers of the mill. The effluent material fluid containment section 107 is fitted at both ends with standard pipe connectors. Connected to the input end of the effluent material fluid containment section 107 is mill body 112 outlet 106. Connected to the bottom end of effluent material fluid containment section 107 is eductor pump 110. Eductor pump 110 has a high velocity input pipe 110*a* and a corresponding low velocity output pipe 110*b*. Cracked crystals are recirculated to the separate system (not shown) by means of low velocity output pipe 110*b*. Standard pipe flange adaptors 103 and 108 are affixed to the mill by means of gaskets.

Figure 2:
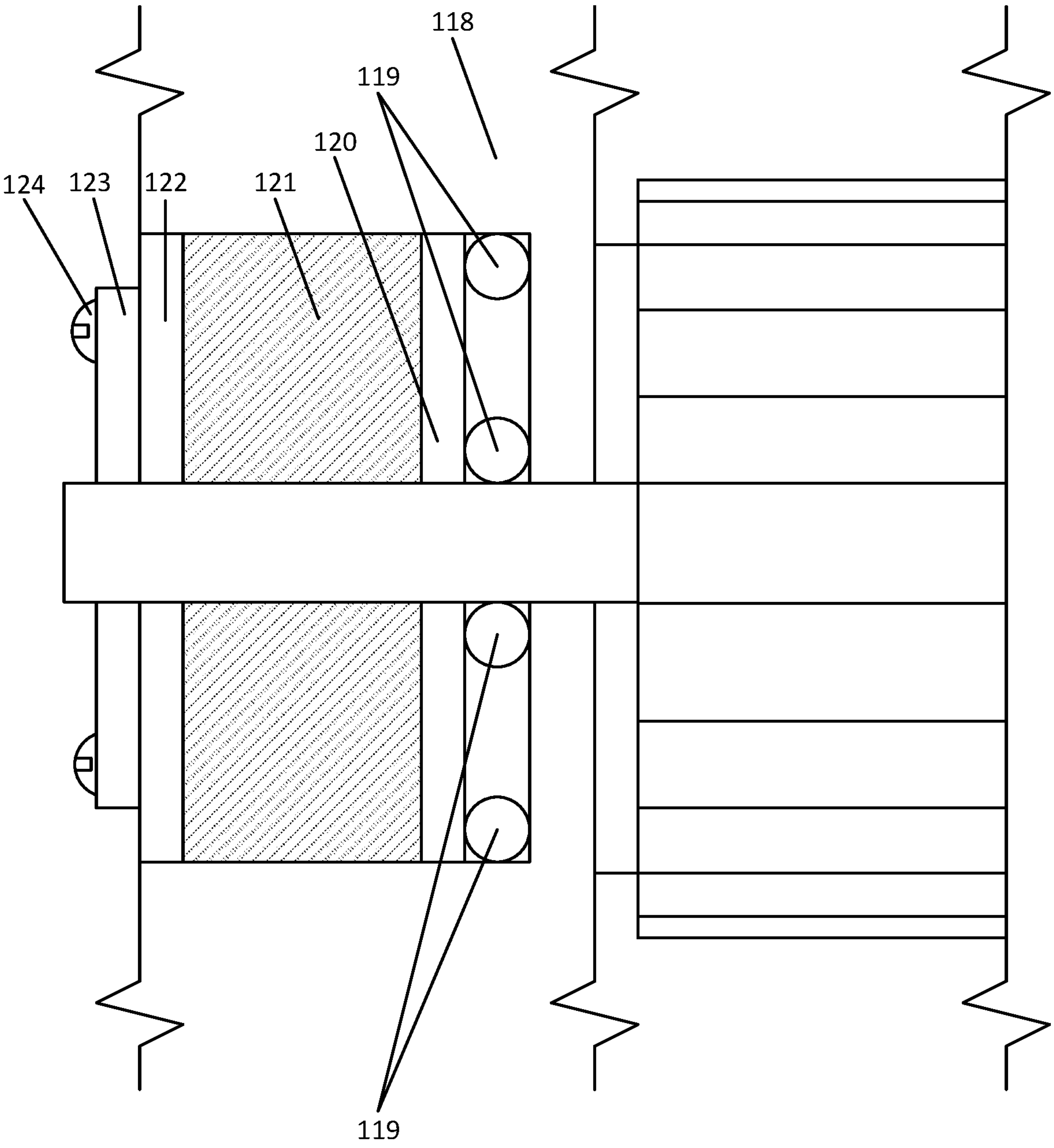
FIG. 2 is a cross section view of one of the bearing/seals associated with one of the central shafts of one of the crushing rotors.
Figure 3:
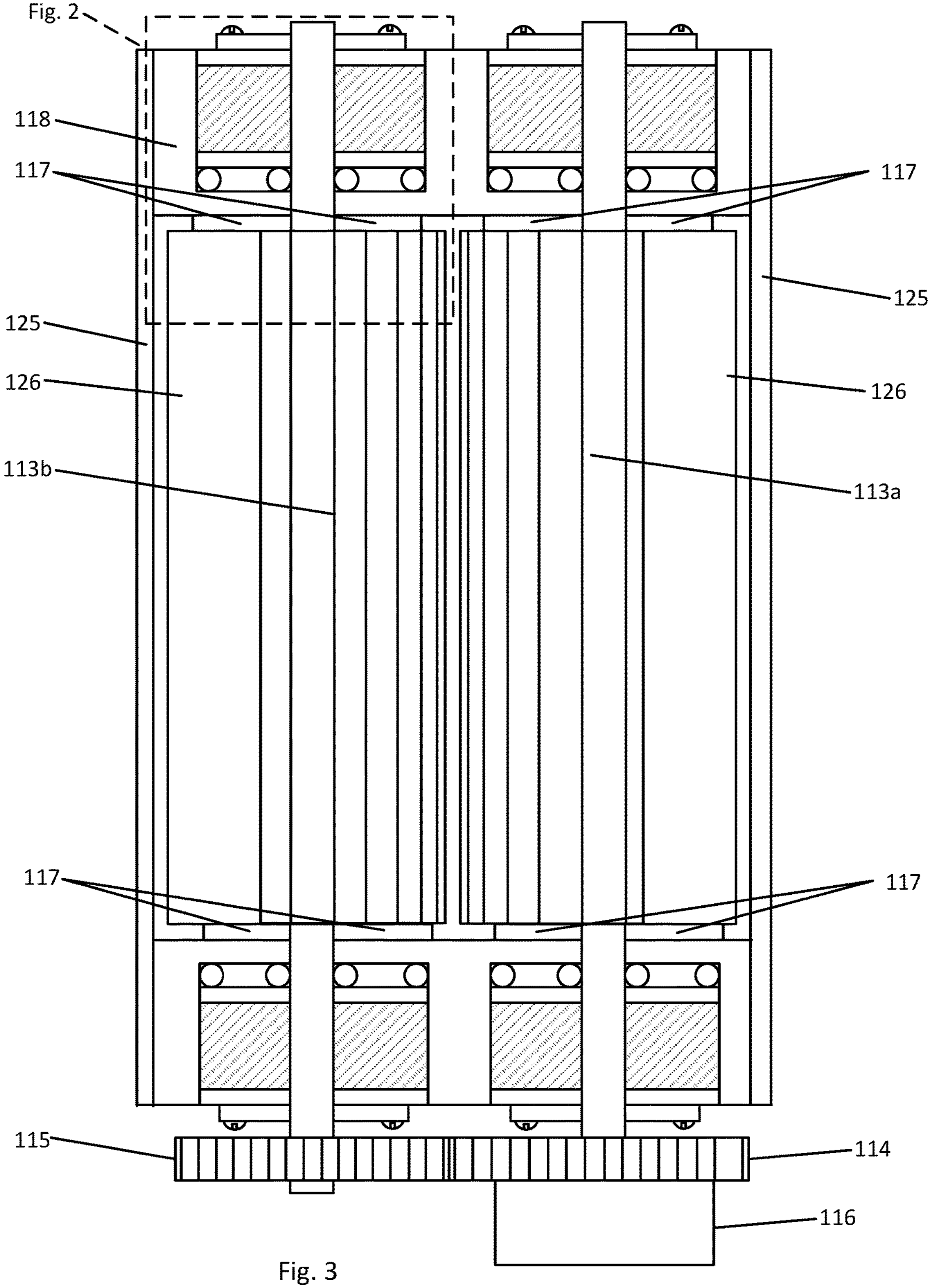
FIG. 3 is a cross section view of the grinding device showing the bearing/seals, central shafts, crushing rotors, electric motor, and drive gears.

Referring now to FIGS. 1 through 3, the fluted mill rollers 113*a* and 113*b* are fluted on their outer surfaces with bearing shafts on both ends. Fluted mill rollers 113a and 113*b* are generally identical in construction. That is to say, they have the same cross-sectional diameter, the same flute height, and the same flute base spread angle. Those having skill in the art will recognize that fluted mill rollers 113*a* and 113*b* may not be identical. They may have different cross-sectional diameters, different flute heights, and different flute base spread angles, and that these and all other embodiments are included, by reference, in the present invention. The bearing shafts associated with fluted mill rollers 113*a* and 113*b* extend in length to accommodate gears 114 and 115, respectively, and electric drive coupling 116. Gears 114 and 115 have different diameters. The electric drive coupling 116 supplies power to gear 114 which turns fluted mill rollers 113*a* and 113*b*. Since gears 114 and 115 have different diameters, the fluted mill rollers 113*a* and 113*b* rotate at different speeds. The fluted mill rollers 113*a* and 113*b* have wear spacers 117 on both bearing shaft ends cushioning each bearing shaft end between the grinding surface and the mill bearing end housing 118. The mill bearing end housing 118 has bearing journals that accommodate the isolation seals 119, seal plate 120, bearings 121, thrust plate 122, and outer seal tension gland 123. The thrust plate 122 is retained by outer seal tension gland 123 which has at least two adjustment fasteners 124. Those having skill in the art will recognize that more than one electric drive coupling 116 may be used to turn the fluted mill rollers 113*a* and 113*b*, that these alternative electric drive couplings may operate at different speeds, that gears 114 and 115 may not be required, and that these and all other embodiments are included, by reference, in the present invention. The mill side housing 125 affixes to the mill bearing end housing 118. The mill material guides 126 are "L"-shaped plates affixed to the mill side housing 125 by one side of the "L" and with the other side of the "L" extending up and turning inwards towards the center of mill body 112 to cause material to pass between the fluted mill rollers 113*a* and 113*b*.

The invention is used as follows: 1) Fluidically carried crystalline material is input to the influent material fluid from the attached operating device (not shown) to the influent material fluid containment section 100 by means of inlet conduit or pipe 101; 2) Fluidically carried crystalline material is conveyed by means of gravity into fluted mill rotors 113*a* and 113*b*. Mill material guides 126 cover the outer edges of fluted mill rotors 113*a* and 113*b* thus causing fluidically transported crystalline matter into the gap between fluted mill rotors 113*a* and 113*b;* 3) Larger crystals of fluidically transported material are crushed and cracked into smaller crystals of fluidically transported material; 4) Smaller crystals of fluidically transported material are transported into effluent material fluid containment section 107 where they are returned to the attached operating device (not shown) by means of eductor pump 110; 5) If larger fluidically carried crystalline material overloads the gap between fluted mill rotors 113*a* and 113*b*, it bypasses them by means of outlet bypass conduit or pipe 102. In this case, larger fluidically carried crystalline material is transported from outlet bypass conduit or pipe 102 to inlet bypass conduit or pipe 109 to the effluent material fluid containment section 107 where they are returned to the attached operating device (not shown) by means of eductor pump 110; 6) Finally, if larger fluidically carried crystalline material overloads the gap between fluted mill rotors 113*a* and 113*b* and the outlet bypass conduit or pipe 102, larger fluidically carried crystalline material is transported out of the system to a drain by means of sanitary drain port 105.

Those having skill in the art will recognize that other embodiments of the present invention are conceivable. For example, more than two fluted mill rollers 113*a* and 113*b* may be used. These additional fluted mill rollers may be arranged such that their rotating axes are above, below, parallel, perpendicular, or at any angle with respect to one another, and that these and all other embodiments are included, by reference, in the present invention.

What is claimed is:

1. A crystal growth enhancement device comprising:

a) a mill body comprising at least two fluted mill roller shafts aligned generally parallel to one another with a gap between them wherein the gap is set to the diameter of a maximum crystal size to be produced by the device;
   i. wherein the fluted mill rollers spin at different speeds;
b) an influent containment section connected to the top of the mill body with a fluidic input pipe connected at the lower end of the influent containment section;
   i. wherein a fluidic flow from the fluidic input pipe keeps material in the influent containment section semi fluidized;
c) an input of an emergency fluidic bypass pipe connected to the influent containment section above the level of the fluidic input pipe;
d) an emergency sanitary drain port connected to the influent containment section above the input of the emergency fluidic bypass pipe;
e) an effluent material fluid containment section connected below the mill body;
f) an output of the emergency fluidic bypass pipe connected to the effluent material containment section above a level of an eductor pump; and
g) the eductor pump connected to the bottom of the effluent material fluid containment section.

2. A crystal growth enhancement device of claim 1 wherein the fluted mill rollers are identical in size.

3. A crystal growth enhancement device of claim 1 wherein the fluted mill rollers are different in terms of diameter.

4. A crystal growth enhancement device of claim 1 wherein the fluted mill rollers are identical in terms of flute height.

5. A crystal growth enhancement device of claim 1 wherein the fluted mill rollers are identical in terms of flute base spread.

6. A crystal growth enhancement device of claim 1 wherein the fluted mill rollers are driven by gears which are in turn driven by a single electric motor.

7. A crystal growth enhancement device of claim 1 wherein the fluted mill rollers are driven by individual electric motors.

8. A crystal growth enhancement device of claim 1 wherein the eductor pump is driven by a pressure differential between a high pressure input pipe and a lower pressure output pipe of the eductor pump.

* * * * *